US012374341B2

(12) United States Patent
Baumgarte

(10) Patent No.: US 12,374,341 B2
(45) Date of Patent: Jul. 29, 2025

(54) CHANNEL-ALIGNED AUDIO CODING

(71) Applicant: Apple Inc., Cupertino, CA (US)

(72) Inventor: Frank Baumgarte, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 18/301,157

(22) Filed: Apr. 14, 2023

(65) Prior Publication Data

US 2023/0335140 A1 Oct. 19, 2023

Related U.S. Application Data

(60) Provisional application No. 63/332,199, filed on Apr. 18, 2022.

(51) Int. Cl.
*G10L 19/005* (2013.01)
*G10L 19/00* (2013.01)

(52) U.S. Cl.
CPC ........ *G10L 19/005* (2013.01); *G10L 19/0017* (2013.01)

(58) Field of Classification Search
CPC . G10L 19/005; G10L 19/0017; G10L 19/008; G10L 19/167; G06N 3/08; H04R 3/12; H04R 2420/07
See application file for complete search history.

(56) References Cited

U.S. PATENT DOCUMENTS 10,492,017 B2 * 11/2019 Pang ....................... H04S 1/005
11,889,281 B2 * 1/2024 Goupy .................... G10L 19/22
2009/0099851 A1 * 4/2009 Pilati ..................... G10L 19/002 704/500
2012/0296658 A1 * 11/2012 Smyth ..................... G10L 19/22 704/500
2013/0304458 A1 * 11/2013 Shavit ..................... G10L 19/22 381/98

(Continued)

FOREIGN PATENT DOCUMENTS

CA 2461830 C * 9/2009 ............. G06F 15/16
CA 3080907 A1 * 5/2019 ......... G10L 19/0204

(Continued)

OTHER PUBLICATIONS

Hierarchical multi-source cues fusion for mono-to-binaural based Audio Deepfake Detection; (Year: 2024).*

(Continued)

*Primary Examiner* — Mohammad K Islam
(74) *Attorney, Agent, or Firm* — Aikin & Gallant, LLP

(57) ABSTRACT

A decoder-side method for outputting several audio channels of a sound program is described. An audio channel of the sound program, a residual signal, a gain parameter, and a delay parameter are received, for example within a bit-stream. The audio channel is adjusted in accordance with the gain parameter and the delay parameter, to produce an adjusted audio signal, and is then combined with the residual signal to produce a combined signal. The audio channel is output as a first audio channel of the sound program for playback, while the combined signal is output as a second audio channel of the sound program. Other aspects are also described and claimed.

20 Claims, 8 Drawing Sheets

(56) References Cited

U.S. PATENT DOCUMENTS

| | | | | |
|---|---|---|---|---|
| 2016/0183026 | A1* | 6/2016 | Liu | H04S 1/00 381/58 |
| 2019/0132591 | A1* | 5/2019 | Zhang | H04N 19/59 |
| 2021/0176583 | A1* | 6/2021 | Kearney | H04S 7/302 |
| 2022/0191615 | A1* | 6/2022 | Goupy | H04W 4/029 |
| 2023/0185518 | A1* | 6/2023 | Yang | H04N 5/77 386/223 |
| 2024/0022787 | A1* | 1/2024 | Aksu | G06N 3/063 |
| 2024/0033624 | A1* | 2/2024 | Phillips | A63F 13/355 |
| 2024/0169998 | A1* | 5/2024 | Meng | G10L 19/022 |

FOREIGN PATENT DOCUMENTS

| | | | | | |
|---|---|---|---|---|---|
| CN | 1208489 | A | * | 2/1999 | G10L 19/0208 |
| JP | 2022548299 | A | * | 1/2020 | G10L 19/167 |
| KR | 102626677 | B1 | * | 3/2015 | G10L 19/008 |

OTHER PUBLICATIONS

Herre et al., “Intensity Stereo Coding”, received from https://www.aes.org/e-lib/browse.cfm?elib=6433, Feb. 1, 1994, 11 pages.

Johnston et al., “Sum-Difference Stereo Transform Coding”, received from https://www.researchgate.net/publication/3532227_Sum-difference_stereo_transform_coding, Apr. 1992, 4 pages.

Van Der Waal et al., “Subband Coding of Stereophonic Digital Audio Signals”, received from https://ris.utwente.nl/ws/portalfiles/portal/6145434/Veldhuis89subband.pdf, Aug. 6, 2002, 4 pages.

Helmrich et al., “Efficient Transform Coding of Two-Channel Audio Signals by Means of Complex-Valued Stereo Prediction”, received from https://ieeexplore.ieee.org/document/5946449, Jul. 11, 2011, 4 pages.

Schuijers et al., “Low Complexity Parametric Stereo Coding”, received from https://www.aes.org/e-lib/browse.cfm?elib=12751, May 1, 2004, 11 pages.

Baumgarte et al., “Binaural Cue Coding—Part I: Psychoacoustic Fundamentals and Design Principles”, received from https://ieeexplore.ieee.org/document/1255439, Nov. 6, 2003, 11 pages.

Hilpert et al., “The MPEG Surround Audio Coding Standard”, received from https://ieeexplore.ieee.org/document/4775887, 5 pages.

Corey I. Cheng, “Method for Establishing Magnitude and Phase in the MDCT Domain”, received from https://www.aes.org/e-lib/browse.cfm?elib=12651, May 1, 2004, 30 pages.

Herre et al., “Combined Stereo Coding”, received from https://www.aes.org/e-lib/browse.cfm?elib=6764, Oct. 1, 1992, 19 pages.

Robinson et al., “Effect of Varying the Interaural Noise Correlation on the Detectability of Tonal Signals”, received from https://pubs.aip.org/asa/jasa/article-abstract/35/12/1947/644777/Effect-of-Varying-the-Interaural-Noise-Correlation?redirectedFrom=fulltext, Dec. 1963, 7 pages.

Lindblom et al., “Flexible Sum-Difference Stereo Coding Based on Time-Aligned Signal Components”, received from https://ieeexplore.ieee.org/document/1540218, Nov. 21, 2005, 4 pages.

ISO, “Information technology—MPEG audio technologies—Part 3: Unified speech and audio coding”, received from https://www.iso.org/standard/82533.html, Apr. 1, 2012, selected pages.

* cited by examiner

CHANNEL-ALIGNED AUDIO CODING

FIELD

This disclosure relates to digital processing or coding of two or more audio channels of a sound program, for bit rate reduction.

BACKGROUND

Two-channel stereo is an audio format that conveys a stereo "image" to the listener. The image is the perceptual product invoked by similarities between the audio signals in the two channels. Several methods have been applied to take advantage of these signal similarities for bit rate reduction. The similarities are associated with redundant signal components, from a signal processing point of view. Furthermore, the limited abilities of human listeners to perceive all details of the image can be considered thereby achieving further bit rate reduction. For instance, with Intensity Stereo coding, only a sum channel of the left and right channel is transmitted along with a panning value, to pan the mono image of the sum signal at the receiver back to the position of the original image. If the original stereo channels are highly correlated, then a strong bit rate reduction is possible. In another technique called Sum-Difference coding, it is possible to fully reconstruct the stereo channels because the difference signal is also transmitted in addition to the sum signal. Sum-Difference coding is also referred to as Mid-Side coding.

SUMMARY

One aspect of the disclosure here is a new method for stereo and multichannel coding in which i) a single selected channel or a sum of two or more channels, ii) one or more residual signals, and iii) one or more parameters, are transmitted to a decoder side process that uses the parameters to undo the coding, to recover the audio channels of the sound program. The method may achieve bit rate reduction even though the two or more input audio channels differ by delay (time delay) and gain. It may achieve similar performance (bit rate reduction) as Sum-Difference coding when the channels are identical, and similar performance as Intensity Stereo coding for stereo signals which only differ by a gain factor. Other aspects are also described.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

Several aspects of the disclosure here are illustrated by way of example and not by way of limitation in the figures of the accompanying drawings in which like references indicate similar elements. In the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to drawings in the figures are now explained. It should be noted that references to "an" or "one" aspect in this disclosure are not necessarily to the same aspect, and they mean at least one. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description. Note that all of the operations described below which are part of an encoder-side method or a decoder-side method may be performed by a suitable, programmed digital computing system, for example a server, a computer workstation, or a consumer electronics product such as a television, a set top box, or a digital media player. In such systems, one or more digital processors (generically referred to here as "a" processor) are executing instructions stored in a machine-readable medium such as solid state memory, to perform the emcoding/coding and decoding methods described below.

Figure 1:
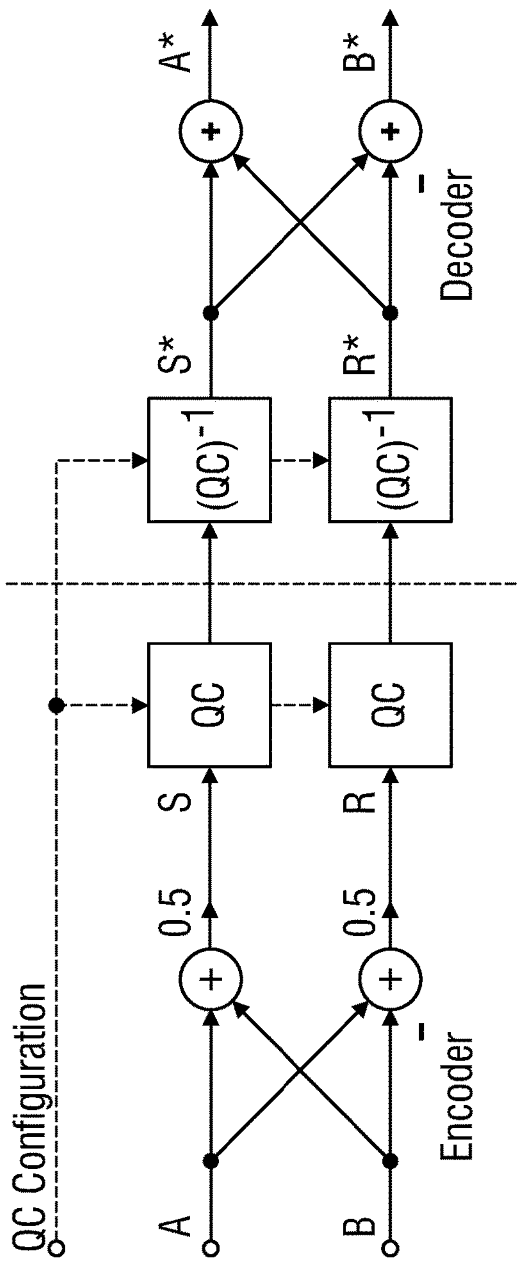
FIG. 1 is a diagram of Sum-Difference (SD) Coding, also known as Mid-Side (MS) Coding.

A diagram of Sum-Difference (SD) Coding, also known as Mid-Side (MS) Coding, is shown in FIG. 1. The signal S is the sum of the input channels A and B, while the signal R is the difference or residual. These are input to a quantization and coding (QC) block which achieves bit rate control and reduces the bit rate; the QC block may be implemented (according to a QC configuration) in any one of a variety of ways depending on the input signals' characteristics. An advantage of using this method compared to directly coding the left (A) and right (B) channels is the potential to significantly reduce the energy of the R signal when A and B are similar. Reduced energy usually translates into a lower bit rate. In the extreme case where A and B are identical, R vanishes.

Figure 2:
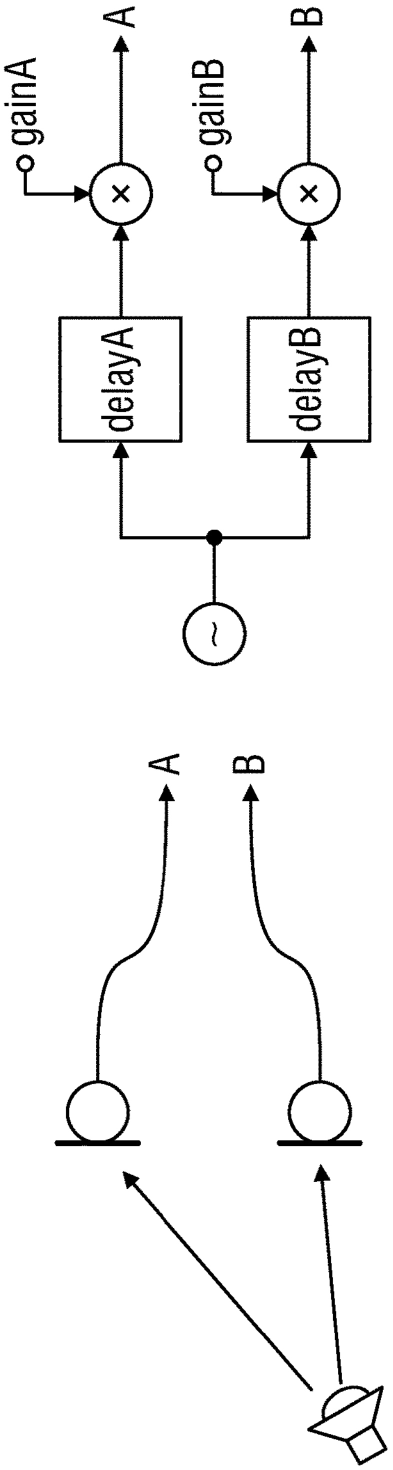
FIG. 2 shows a stereo recording setup of a single sound source in free field.

However, the efficiency of conventional SD coding for highly correlated signals is drastically reduced when the two input audio channels deviate by even only a small time-delay or level difference. For instance, consider the arrangement in FIG. 2, which is a stereo recording setup of a single sound source in free field, including a simplified model of it shown on the right side of the figure. Since the source is not centered, its emitted sound will reach the two microphones at various times and with various levels as shown in the simplified model. Such a recording will result in a non-zero difference signal R in the system of FIG. 1, and as a result the coding efficiency of the system becomes drastically reduced.

Figure 3:
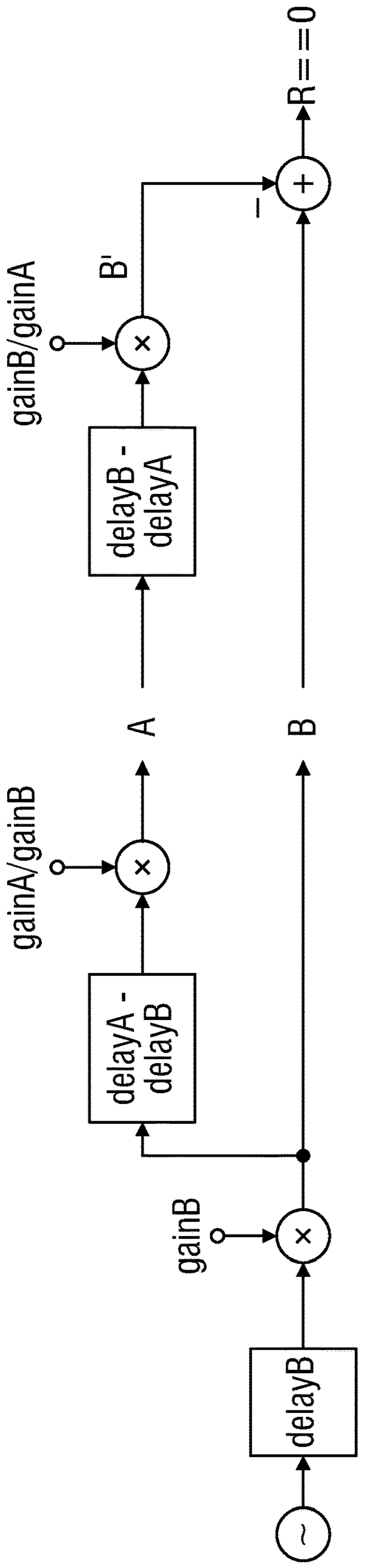
FIG. 3 illustrates an equivalent recording model (left side) and A channel alignment to minimize the energy of the difference channel R (right side) of a channel aligned coding, CAC, method.

One aspect of the disclosure here is a new, Channel-Aligned Coding (CAC) method that may have better efficiency than conventional SD coding. The CAC method is based on aligning one input channel to the other before the difference signal is calculated. FIG. 3 shows the equivalent model where the A signal can be derived from the B signal by applying a delay and gain. Application of the delay (time delay) is also referred to here as time delay compensation. With that, one can align the A signal to the B signal by applying the inverse processing to it, as shown on the right of FIG. 3. For this simple example, the difference between the aligned channels is zero (shown on the right side). Note that in some configurations, negative delays may require additional system delay to achieve the alignment.

Figure 4:
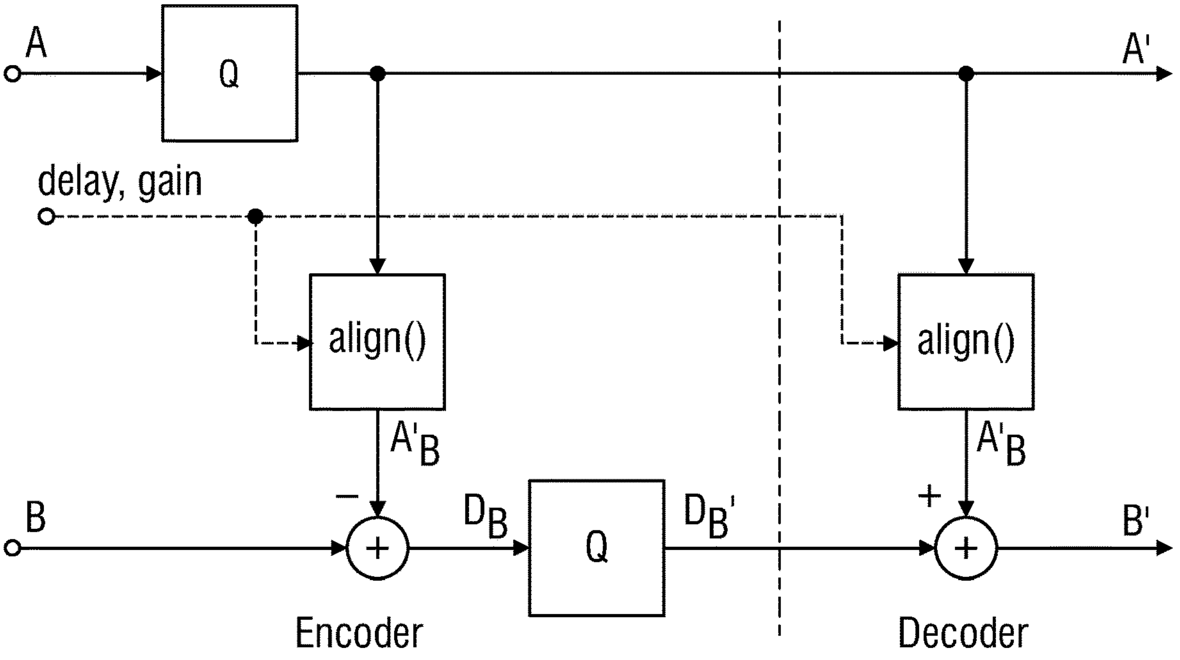
FIG. 4 is a diagram of an example illustrating the CNC method, depicting an encoder and decoder.

In one aspect, the Channel-Aligned Coding (CAC) method may be as shown in FIG. 4, where there is an alignment block align( ) to align the two channels A, B before the difference signal $D_B$ (also referred to here as a residual signal) is derived (in accordance with FIG. 3.) The alignment block, align( ), is driven or controlled by, in this aspect, both a delay parameter and a gain parameter. The gain parameter may be a time sequence of gain values in a sub-band domain—it varies over time and on a per sub-band basis over an entire duration of the sound program. In one aspect, the delay parameter may also be a time sequence of delay values in the sub-band domain—it too may vary over time and on a per sub-band basis over the entire duration of the sound program. The gain parameter and the delay parameter may be updated on a frame-by-frame basis for a given channel time sequence. These parameters are also transmitted to the decoder, as side information indicated by the dotted line. At the decoder, the alignment is repeated to reconstruct the channel B by adding the difference signal $D'_B$ and the aligned signal $A'_B$. The use of the delay parameter in reconstructing an audio channel is also referred to as time delay compensation. The figure also shows signal quantization blocks Q which produced quantized version of the A and $D_B$ signals. Further coding may be applied to the quantized versions of the A and $D_B$ signals before transmission to the decoder, although such coding is not shown for clarity. The decoder side processing thus outputs the reconstructed channels A' and B' for further playback processing which is not shown (e.g., equalization, dynamic range control, downmix, etc. as needed for a particular playback device.)

Modern perceptual audio codecs take advantage of coding the audio signal in a sub-band domain. For example, the modified discrete cosine transform, MDCT, domain is used in many recent audio codecs such as MPEG-4 AAC to represent each audio channel in the MDCT domain, and the coding process is applied to the sub-band signals of each channel. The following description is based on the MDCT representation, but it is also applicable to other filter banks and transforms.

CAC coding in sub-bands has several advantages. The codec can selectively apply CAC only to those bands that can be more efficiently encoded by CAC, rather than by other coding methods. Furthermore, the side information which contains a gain parameter, and in some cases also a delay parameter (which are used in the decoder side to control the CAC method), can be shared across several or all sub-bands, which reduces the side information bit rate. In one aspect of the disclosure here, there are two parameters, delay, and gain, which are chosen to be transmitted as side information because they are likely to be consistent across several sub-bands.

Figure 5:
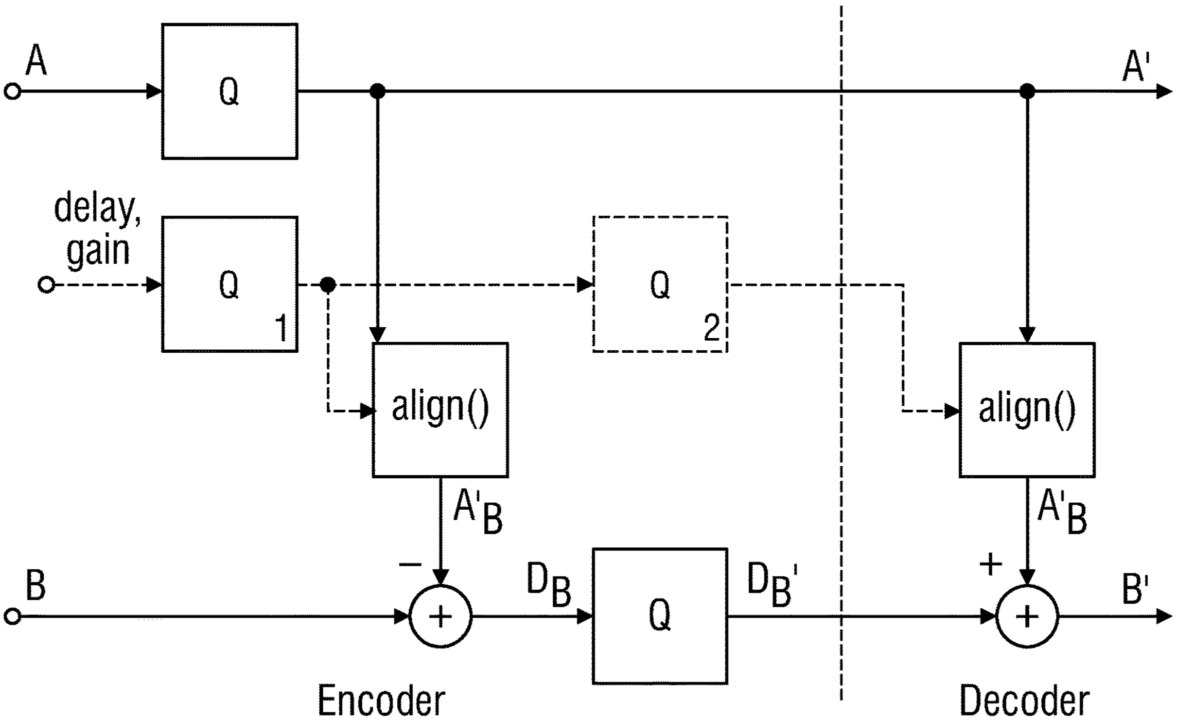
FIG. 5 shows two locations for the delay and gain parameter quantization, Q.

The bitrate of the side information may be reduced by quantizing the parameters (that are in the side information.) FIG. 5 shows two locations for the quantizer. For location (1), the align( ) blocks of encoder and decoder will be controlled by identical quantized delay and gain parameters. In contrast, for location (2), only the decoder will use the quantized parameters while the encoder will align the channels based on the un-quantized versions of the parameters. Location (1) may be preferred in high-bitrate applications where it is desired to reconstruct the signal waveform as closely as possible. When location (2) is used, better alignment can potentially be achieved in the encoder, which can translate into a bit rate reduction. However, in this case the alignment in the decoder may have a slight deviation from the encoder, depending on the parameter quantization error. The deviation may be inaudible if the error is small.

The side information bit rate for the parameters can be further reduced by entropy coding. For example, differential Huffman coding can be applied to the parameters (before transmitting them in the side information.) When implemented in sub-band domain, the parameter differences can be calculated based on neighboring sub-bands or based on the same sub-band in subsequent audio frames, for example.

Figure 6:
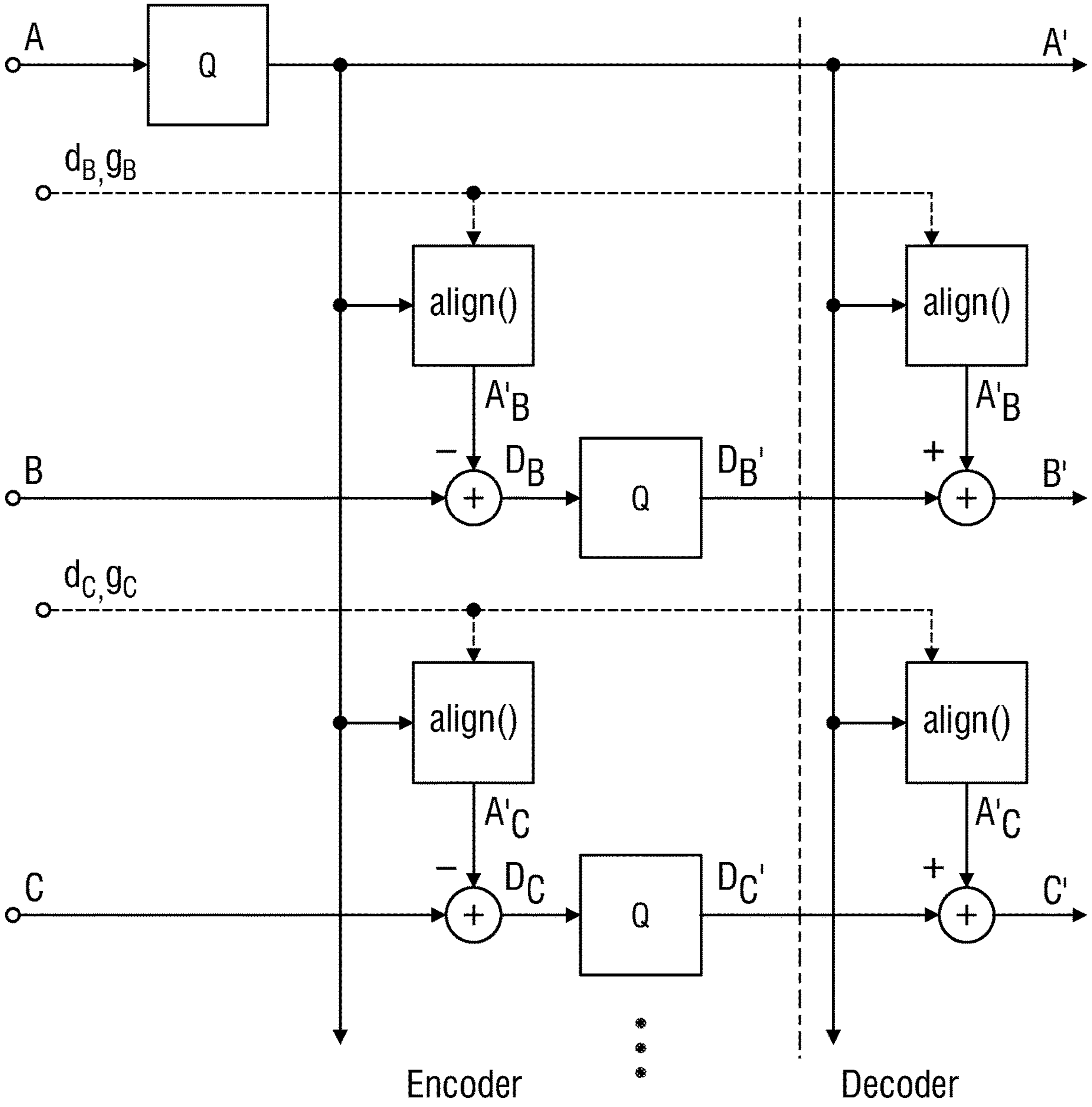
FIG. 6 shows an example of the CAC method extended to multi-channel signals.

The CAC method described above can be extended to multi-channel signals (more than two audio channels), as shown in FIG. 6. In that case, one channel (here, A) is selected for transmission. A difference (residual) signal $D_B$, $D_C$, etc. for each of the remaining channels (relative to A) is transmitted as well. Except for the transmitted channel A, each of the other channels has associated individual gain and delay parameters (db, gb), (dc, gc), etc. that align the transmitted channel A to it before the difference (residual) signal $D_B$, $D_C$, etc., is computed as described above or as shown in FIG. 6. Each difference (residual) signal $D_B$, $D_C$, etc. and its respective parameters d, g, are then transmitted (along with the channel A) to the decoder. There, the received channel A is aligned using the received parameters of a given, received difference signal, DB, and is then added to the received difference signal as shown in the figure which reconstructs the channel B. That is repeated to reconstruct the remaining other channels C, etc.

For some multichannel audio signals, it can be advantageous to divide the total number of channels into channel groups and to apply CAC to each group independently. For example, if the rear channels of a 5.1 surround signal have only a small similarity to the front channels, the rear channels can be treated as an independent channel group and one of the rear channels will be aligned to the other rear channel to minimize the difference (residual) signal energy.

It is not necessary to always align the same channel to the others. Given that the digital signal processing here is on a per frame or window basis (e.g., where each frame or window contains the samples of a digital audio signal that span a few milliseconds or a few tens of milliseconds), which may also be on a per sub-band basis within each frame or window, the roles of the channels can be switched dynamically from one audio frame to a subsequent audio frame. For example, for a stereo signal with L and R channels, in frame n, A=L and B=R while in frame n+1, A=R and B=L. Also, CAC may be applied only to selected audio frames and sub-bands where it is beneficial depending on the audio signal.

Channel-Aligned Sum-Difference Coding

When comparing SD coding as shown in FIG. 1 with direct Left/Right coding, one can observe that the quantization noise generated by the two quantizers of each system may result in a different cross-correlation of the overall quantization noise between the two output channels. The perceived width of the noise when listening over stereo headphones or loudspeakers corresponds to the cross-correlation. Higher cross-correlation results in a narrower image.

SD coding is most efficient when L and R are similar. This is the case when the cross-correlation between L and R is exceedingly high and the stereo image is very narrow and focused, like a point source. For such a signal, uncorrelated noise may be easier to hear due to the spatial unmasking effect because the noise is spread across a wider angle than the signal. Therefore, it may be advantageous to use a quantization method that generates correlated noise between the two channels, as is possible for SD coding as shown below.

Figure 7:
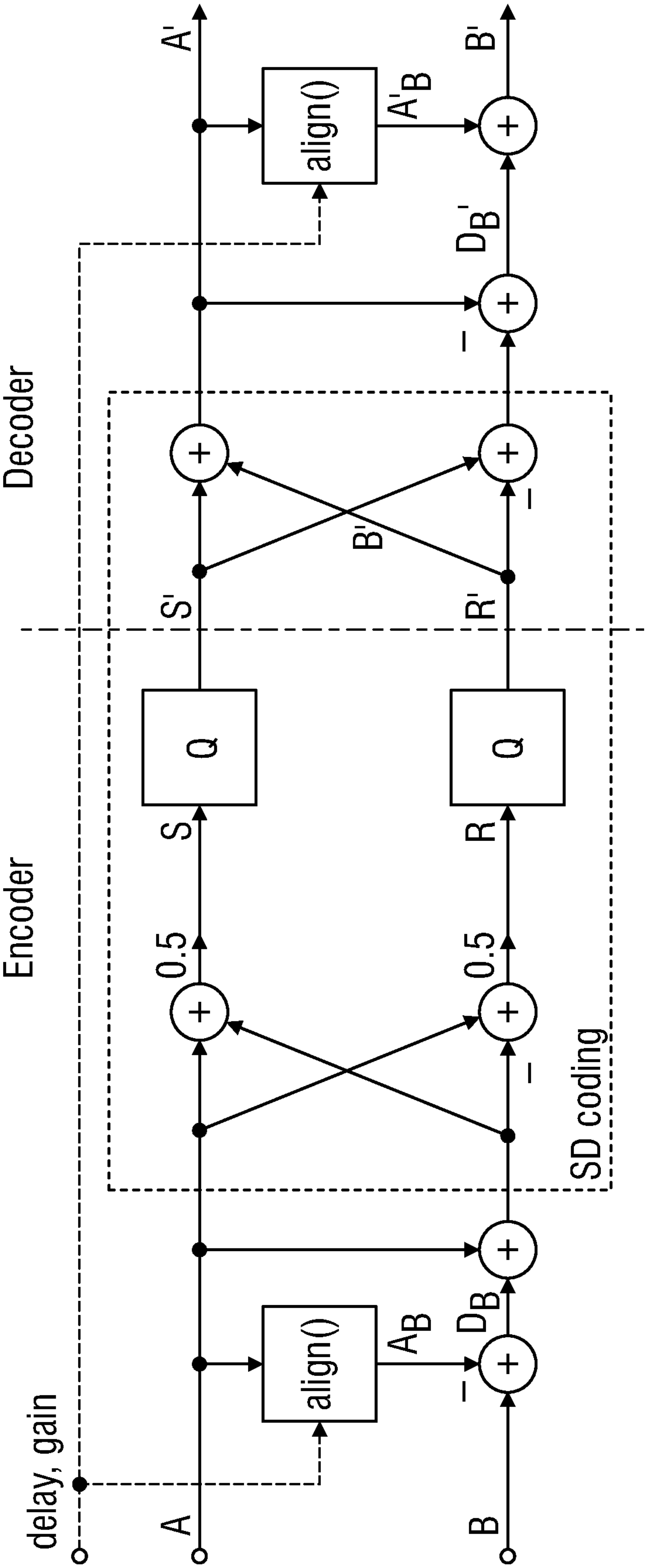
FIG. 7 shows an example of enhanced channel alignment that may be applied to the SD encoding-decoding system of FIG. 1.

To combine the advantages of correlated quantization noise and aligned-channel coding, the basic SD coding system of FIG. 1 may be enhanced by channel-alignment as shown in FIG. 7. In the enhanced system, channel A is aligned to B, resulting in $A_B$. The aligned signal is subtracted from B and channel A is added before SD coding is applied.

In mathematical terms, the sum and residual signals are calculated by:

$$S=0.5(A+B+[A-\text{align}(A)])=0.5(2A+B-\text{align}(A))$$

$$R=0.5(A-B-[A-\text{align}(A)])=0.5(B-\text{align}(A))$$

The alignment parameters to minimize the side signal energy are identical to the ones derived for the L/R coding case. In other words:

$$\|B-\text{align}(A)\| \xrightarrow[g_B,d_B]{} \text{Min}$$

Figure 8:
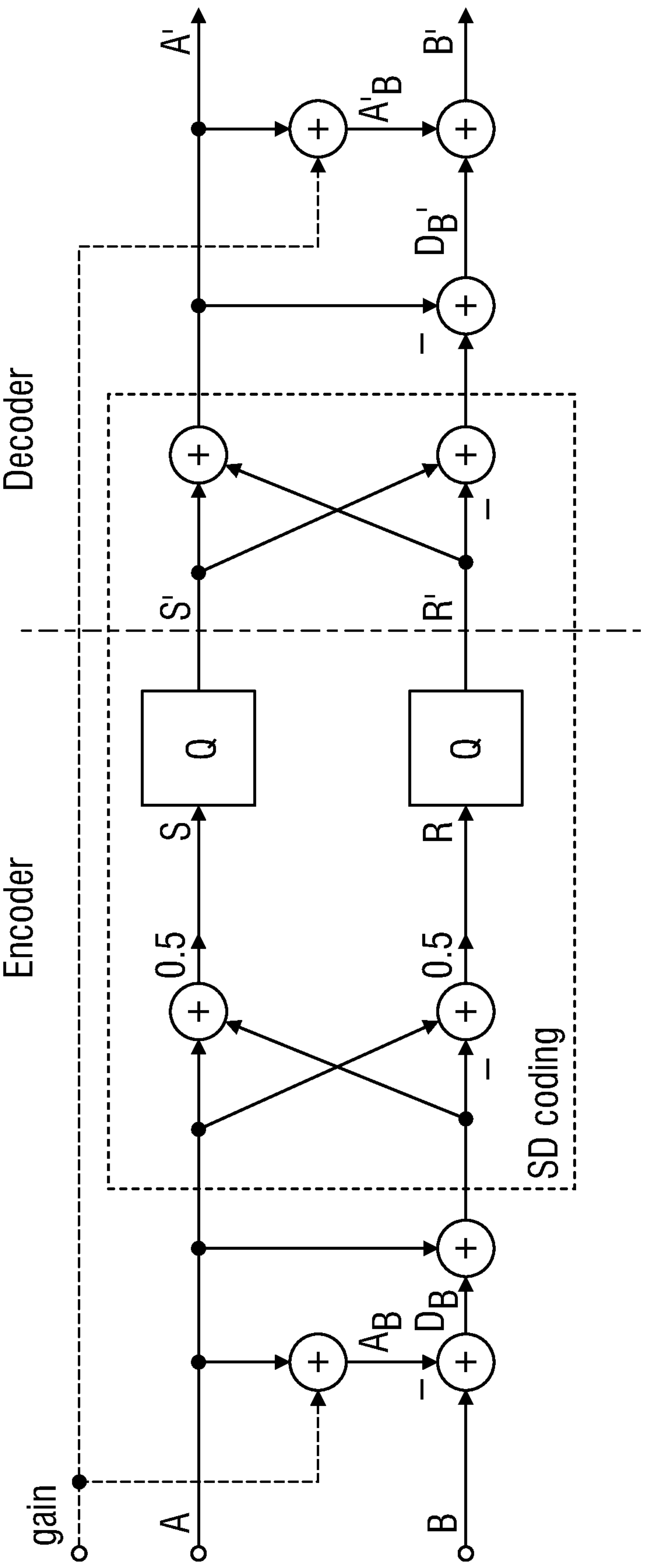
FIG. 8 illustrates an example, simplified version of an SD system useful when the input channels are time-aligned.

The quantization noise correlation can be approximated by assuming that we can replace each quantizer by an independent additive noise source, $N_S$ for the sum signal, and $N_R$ for the residual signal. This is shown in FIG. 8 for SD coding and channel-aligned SD coding, simplified by assuming that both channels A and B are zero. For SD coding, the normalized cross-correlation of the quantization noise components $N_S$ and $N_R$:

$$\rho_{A'B'}(N_S)=1$$

$$\rho_{A'B'}(N_R)=-1$$

The overall quantization noise correlation can be controlled by adjusting the relative noise levels of the quantizers, for example by using different quantization step sizes.

For channel-aligned SD coding of FIG. 7, the quantization noise correlation also depends on the alignment parameters.

For the generic case, the normalized cross-correlation (NCC) of the quantization noise components in the output channels is written as:

$$\rho_{A'B'}(N_S)=\text{NCC}(N_S,\text{align}(N_S))$$

$$\rho_{A'B'}(N_R)=\text{NCC}(N_R,\text{align}(N_R)-2N_R)$$

For the special case when B==A, the optimum alignment is align(A)==A, which means that the channel-aligned SD system behaves identically to the basic SD system. In that case the quantization noise correlation is:

$$\rho_{A'B'}(N_S)=\text{NCC}(N_S,N_S)=1$$

$$\rho_{A'B'}(N_R)=\text{NCC}(N_R,-N_R)=-1$$

For the special case where B==gA, with the constant gain g, the optimum alignment is align(A)==gA. In that case the quantization noise correlation is (for g<2):

$$\rho_{A'B'}(N_S)=\text{NCC}(N_S,gN_S)=1$$

$$\rho_{A'B'}(N_R)=\text{NCC}(N_R,(g-2)N_R)=-1$$

These cases illustrate that the noise component of $N_S$ in the output signal closely approaches the cross-correlation and panning of the signal, which is advantageous in terms of avoiding spatial unmasking. The noise component of $N_R$ in the output signal usually has negative cross-correlation, but the correlation can be positive if the gain is larger than 2 or when a nonzero delay results in a phase inversion. The noise level of $N_R$ can be reduced relative to $N_S$ to avoid spatial unmasking.

In addition to the negative cross-correlation of the $N_R$ related noise, unmasking may be caused when g<1 because there is more $N_R$ related noise energy located on the opposite side of the sound source. For example, for g=0.5 the sound source is expected to be located close to the location of A since the B is approximated as B=0.5 A. However, the noise $N_R$ is panned the opposite way, i.e. $B_{N_R}=-1.5A_{N_R}$. To minimize or to avoid unmasking due to the opposed panning, it may be advantageous to dynamically assign the audio channels to A and B such that g>1. The assignment information can be sent as side information to the decoder.

Simplified Channel-Aligned Sum-Difference Coding

Many audio productions contain mono audio objects that are placed into the stereo image by panning (a common technique used in mixing on digital audio workstations). When applied to a single object, this technique results in a certain gain and zero delay between the channels. For stereo signals that contain such panned objects, a simplified alignment method with less complexity can therefore achieve good performance. In this case the alignment block uses a delay of zero, so that it can be simplified to just a multiplier for the gain factor. This is shown in FIG. 8 for the channel-aligned SD system.

Channel-Aligned Coding For Multichannel Audio

Figure 9:
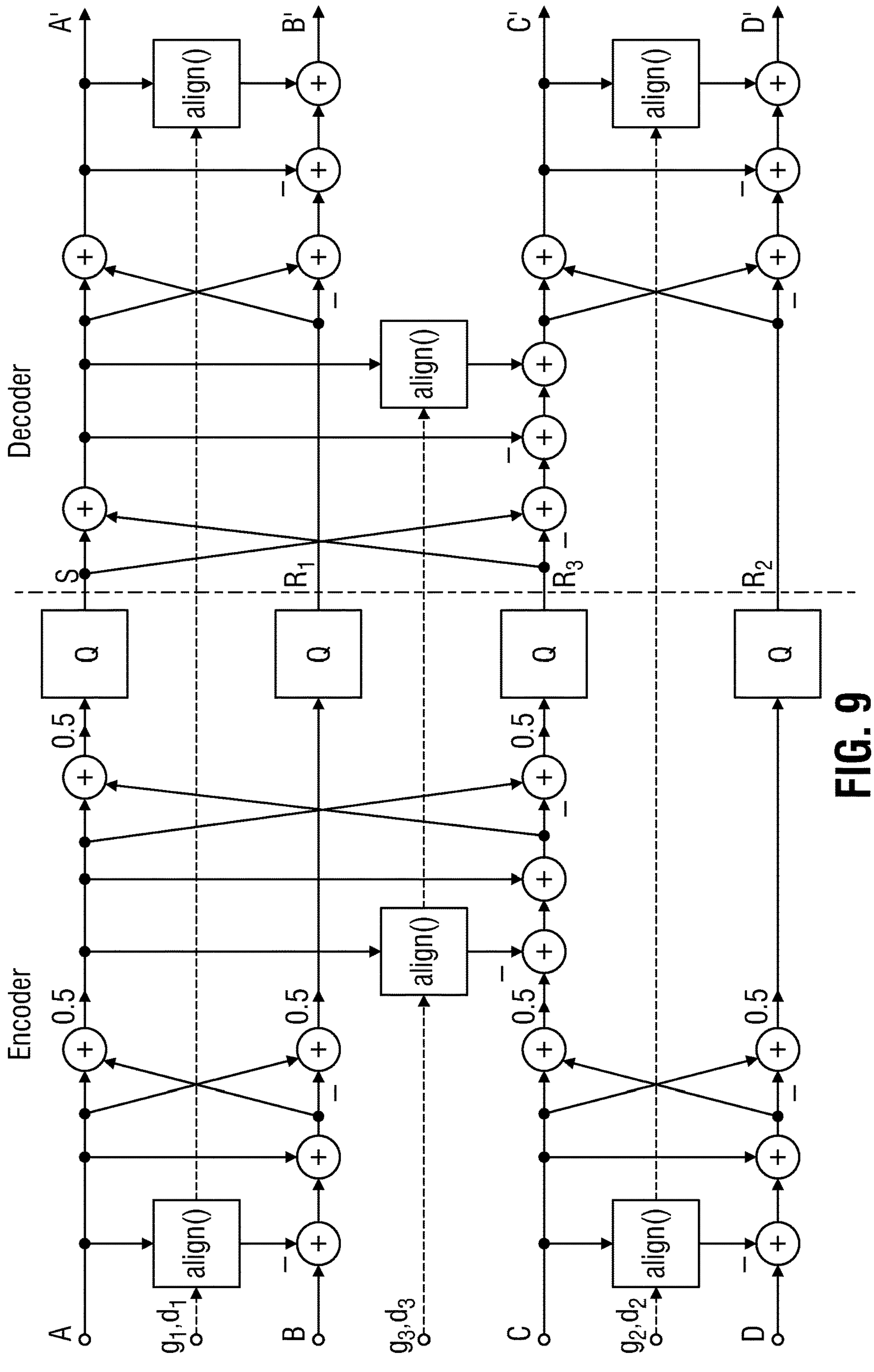
FIG. 9 depicts an example of channel-aligned SD coding for four channels.

The channel-aligned SD coding approach can be extended to audio formats with more than two channels. Since the core SD structure has two input channels and transmits a sum and residual channel, it can be extended for multichannel signals by cascading multiple SD structures. An example for four channels is shown in FIG. 9, where the sum signal S along with three residual signals $R_1$, $R_2$, $R_3$, are transmitted to the decoder.

Other topologies are possible that also result in a single transmitted sum channel and residual channels. This approach can be applied to any number of channels from a multi-channel signal. Since only a single sum channel is transmitted that has a comparable bitrate of a regular audio channel, we expect a significant bitrate reduction because each residual channel is expected to consume less bitrate than a regular audio channel for highly correlated input channels.

Channel-Aligned Coding Based On Adaptive Mixing Matrix

As mentioned above, bitrate reduction and audio quality optimization approaches may include the following strategies:

Minimization of the residual (R) channel energy to reduce bit rate,

Minimization of quantization noise, especially those components that will be perceived in a different location than the main signal source. Since those components are more prone to spatial unmasking, they should have a lower level than components that are perceived in the same location as the main audio content.

Figure 10:
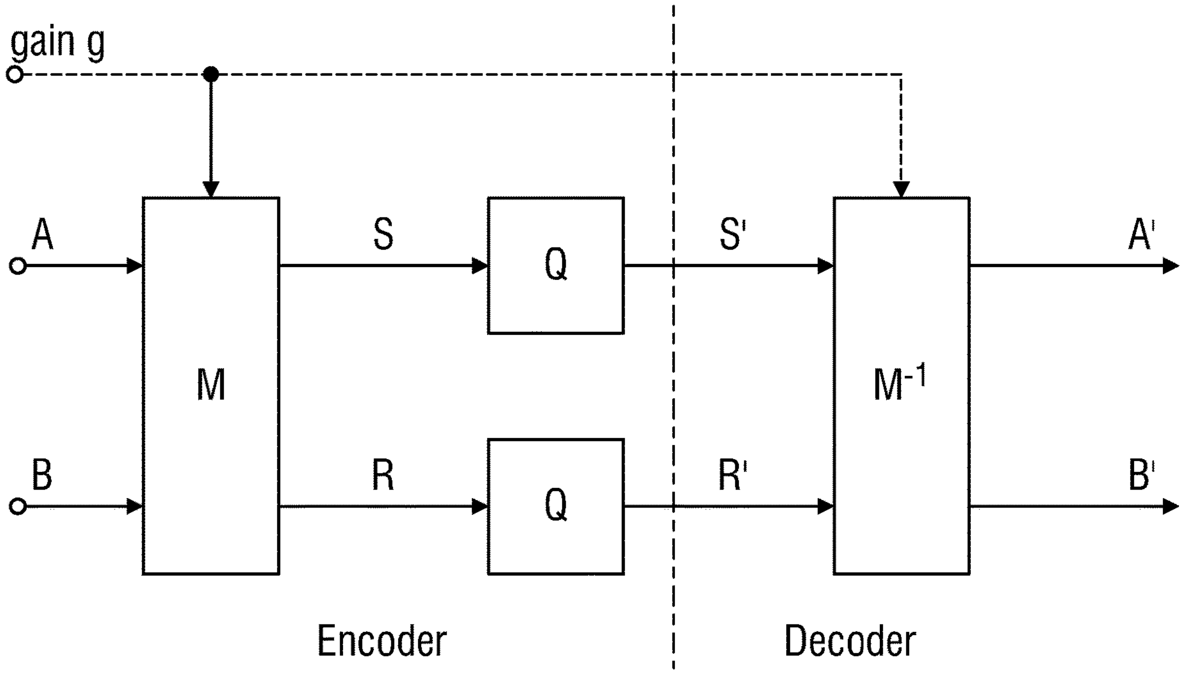
FIG. 10 is a diagram of an example coding system that combines CAC with an adaptive mixing matrix.

Both approaches are considered above, by combining CAC with L/R or M/S coding. Here we propose a combination of CAC with an adaptive mixing matrix, where the CAC does not include time-delay compensation. FIG. 10 shows the block diagram of the system with the mixing matrix M and its inverse $M^{-1}$. The mixing matrix coefficients are calculated depending on the gain parameter g. The matrix coefficients are designed to fulfill both criteria above.

The matrix coefficients for a 2×2 mixing matrix M may be defined as $$M = \begin{bmatrix} a & b \\ c & d \end{bmatrix} \tag{1}$$

An encoder-side process computes the mixing matrix coefficients so that the energy of R, the residual signal, is reduced or even minimized. In such a process, a single parameter, for example a gain parameter g, is sufficient for a complementary decoder-side process to compute the inverse of the mixing matrix. The inverse matrix may be defined as $$M^{-1} = \frac{1}{|M|}\begin{bmatrix} d & -b \\ -c & a \end{bmatrix} \tag{2}$$

where one can assume that the determinant |M|=ad−bc=1. The vector notation of the signal pairs in FIG. 10 may be defined as $$X=[A\ B] \tag{3}$$

$$X'=[A'\ B'] \tag{4}$$

$$Y=[S\ R] \tag{5}$$

$$Y'=[S'\ R'] \tag{6}$$

Each vector contains a pair of samples. The samples can represent the time domain signal or frequency domain signal (sub-band sample), such as an MDCT sub-band sample. With the vector notation, the matrix multiplication operations can be written as:

$$X \cdot M=Y \text{ and} \tag{7}$$

$$Y' \cdot M^{-1}=X' \tag{8}$$

To minimize the energy of R using the gain parameter g, one can use the same approach as in the previous sections to compute the residual as the difference of the gain-aligned channels:

$$R=-gA+B \tag{9}$$

According to (7), R is calculated from the input signal X by $$R=bA+dB \tag{10}$$

By comparing the coefficients in (9) and (10), two matrix coefficients are determined:

$$b=-g \text{ and } d=1 \tag{11}$$

Using (8) to compute A' and B', one can eliminate one more variable by using (9) and (11):

$$A' = dS' - cR' = S' - c(-gA' + B') \tag{12}$$

$$\rightarrow S' = (1 - cg)A' + cB' \tag{13}$$

$$B' = -bS' + aR' = gS' + a(-gA' + B') \tag{14}$$

$$\rightarrow S' = aA' + \left(\frac{1-a}{g}\right)B' \tag{15}$$

Comparison of the coefficients in (13) and (15) results in $$a=1-cg$$

At this point, the matrix coefficient c is the only remaining free parameter. It is used to minimize the quantization noise energy emanating from the residual signal quantization ($N_R$). Two quantization noise sources N_S, N_R can be used to model the quantizers Q in FIG. 10, and these are input to the inverse matrix multiplication operation $M^{-1}$ which can be seen in the decoder side of FIG. 10. Quantization noise $N_A$ and $N_B$ appears in the output channels of the inverse matrix multiplication operation $M^{-1}$. A similar vector notation is used as above:

$$N_Y=[N_S\ N_R] \tag{16}$$

$$N_X=[N_A\ N_B] \tag{17}$$

$$N_Y M^{-1}=N_X \tag{18}$$

Using (18) results in the following expressions for the output noise signals:

$$N_A=N_S-cN_R \tag{19}$$

$$N_B=gN_S+(1-cg)N_R \tag{20}$$

The noise energy originating from $N_R$ is therefore:

$$E_R=(c^2+(1-cg)^2)N_R^2 \tag{21}$$

The minimum energy is reached for any c that fulfills $$(c^2+(1-cg)^2)\rightarrow_c \text{Min.} \tag{22}$$

The solution is $$c = \frac{g}{1+g^2}, \tag{23}$$

hence, the minimum energy is $$E_R = \frac{1}{1+g^2}N_R^2. \tag{24}$$

With that, the output quantization noise is $$N_A = N_S - \frac{g}{1+g^2}N_R \tag{25}$$

$$N_B = gN_S + \frac{1}{1+g^2}N_R \tag{26}$$

With (23) and 0, we obtain the matrix coefficient $$a = \frac{1}{1+g^2}. \tag{27}$$

In summary, the adaptive matrix and its inverse are $$M = \begin{bmatrix} \frac{1}{1+g^2} & -g \\ \frac{g}{1+g^2} & 1 \end{bmatrix}, \tag{28}$$

$$M^{-1} = \begin{bmatrix} 1 & g \\ \frac{-g}{1+g^2} & \frac{1}{1+g^2} \end{bmatrix}. \tag{29}$$

It can be shown that |M|==1. It is interesting to note that the adaptive matrix is equivalent to L/R coding if g=0 and it is equivalent to M/S coding if g=1.

Given the matrix coefficients, the stepwise processing of the channel signals can be written in scalar notation:

$$S = \frac{1}{1+g^2}A + \frac{g}{1+g^2}B \tag{30}$$

$$R = -gA + B \tag{31}$$

$$A' = S' - \frac{g}{1+g^2}R' \tag{32}$$

$$B' = gS' + \frac{1}{1+g^2}R' \tag{33}$$

To limit the range of the gain so that |g|≥1, the L/R input channels can be swapped (when mapped to AB) if necessary to achieve that. A limited range of g is advantageous as it reduces the range that needs to be considered for parameter tuning of a codec to achieve the best bit rate versus quality tradeoff.

A comparison of the output noise level gain for each channel for noise that originates from the residual signal quantizer ($N_R$) can be plotted based on the noise analysis for the enhanced SD coding above and the matrix-based coding in (25) and (26). For this comparison, the residual channel signal may be normalized to $$R = \frac{gA - B}{2}$$

for all coding methods. It shows that the noise gain of the matrix-based coding is significantly lower.

Normalized Adaptive Mixing Matrix

In one aspect, the adaptive mixing matrix introduced above can be normalized such that the forward and inverse matrix are identical:

$$M = M^{-1} = \frac{1}{1+g^2}\begin{bmatrix} 1 & g \\ g & -1 \end{bmatrix}. \tag{34}$$

When applying the channel-swapping method similarly as described above to achieve |g|≤1, the symmetric matrixes result in a similar energy for the Sum and Residual, $E_{S,R}$ signal compared with the input signal $E_{A,B}$.

$$E_{S,R} = \frac{A^2 + B^2}{1+g^2} = \frac{E_{A,B}}{1+g^2} \tag{35}$$

As was suggested earlier, g may be computed on a per audio frame basis, and on a per sub-band basis in the case of sub-band domain (as compared to time domain.) For example, the level difference between the two input audio channels (in the same frame), is measured by an encoder-side process, e.g., as a ratio, and this level difference may be used as (or may become a good estimate for) g; g increases as the level difference increases. The g values can be encoded as described below (for further bitrate reduction.)

It can be shown that the normalized matrix is a method which is a superset of traditional stereo coding techniques, and this is summarized in Table 1 below.

TABLE 1

Comparison of normalized mixing matrix and traditional coding methods.

| Traditional method | Gain value to emulate the method | Normalized matrix | Comment |
|---|---|---|---|
| Left/Right coding | g = 0 | $M = \begin{bmatrix} 1 & 0 \\ 0 & -1 \end{bmatrix}$ | Sign of Right channel is switched for transmission |
| Mid/Side coding | g = 1 | $M = \frac{1}{2}\begin{bmatrix} 1 & 1 \\ 1 & -1 \end{bmatrix}$ | |
| Intensity Stereo coding | g | $M = \frac{1}{1+g^2}\begin{bmatrix} 1 & g \\ g & -1 \end{bmatrix}$ | Residual channel is not transmitted |

Coding of CAC Parameters

The normalized mixing matrix is determined by a single coded gain parameter $g_c$. The channel swapping can be controlled depending on the value of $g_c$. For example, as described above, the channels are swapped when $|g_c|>1$. Correspondingly, the gain used to determine the coefficients of the matrix is:

$$g = \begin{cases} g_c & \text{if } |g_c| \le 1 \\ \frac{1}{g_c} & \text{else} \end{cases} \tag{36}$$

To reduce the bitrate, the gain values $g_c$ can be quantized, for example by using a logarithmic scale which corresponds to uniform intervals on a loudness scale. The quantized values can then be encoded to further reduce the bitrate. For example, entropy coding can be used to take advantage of the statistics of the coded value. More frequently occurring values are coded with less bits than others—this is known as variable length coding. A common technique for entropy coding is Huffman coding. To further reduce the bitrate, run length coding can be applied which encodes the number of repeated values instead of encoding the same value multiple times in a sequence. Run length coding can take advantage of the properties of CAC with respect to the expectation that gain values across sub-bands are similar or equal for a particular sound source.

Table 2 shows an example bitstream syntax for the CAC gain parameter encoding, for a single audio frame, which makes up an encoded audio bitstream that is being transmitted from the encoder side to the decoder side. The payload cacGain( ) may be present in every frame of the encoded audio bitstream, among other payloads, and it controls the application of the inverse CAC adaptive matrix in the decoder.

The decoder may be configured with a constant number of sub-bands for each channel, and a CAC mixing matrix can be applied to each sub-band with an individual (respective) CAC gain parameter. As described above, in this example, the index of the quantized gain parameter, cacGainIndex is what is being transmitted to the decoder side, not the actual gain parameter values. Also, the index is encoded using for example Huffman coding. The decoder has stored therein a table (a predefined table) like Table 3 which contains a list of gain parameter values, e.g., between 10 to 20 different values, and their respective index values. The run length repeatCount is also Huffman encoded. Starting from the lowest sub-band, the run-length indicates how many sub-bands the same cacGainIndex is applied. For the next sub-band, the next cacGainIndex is applied and repeated in repeatCount sub-bands, and so on. The last value of repeatCount for the frame is kRepeatAllRemaining, which indicates that the last cacGainIndex is used for all remaining sub-bands. As an example, consider the case where there are a total of 30 sub-bands. If the decoder process receives cacGainIndex=4, repeatCount=10, cacGainIndex=5, repeatCount=43, then it will set gains of the first 11 bands according to the gainIndex of 4, and the remaining 19 bands will be set to have a gainIndex of 5.

TABLE 2

Example payload syntax for the CAC side information in audio frame (vlclbf means variable length coding)

| Syntax | No. of bits | Mnemonic |
|---|---|---|
| cacGain( ) | | |
| { | | |
| kRepeatAllRemaining = 43 [this is a special flag that instructs the decoder to re-use the current g value for all subsequent or remaining sub-bands, e.g., it can be an integer larger than the total number of sub-bands] | | |
| do { | | |
| cacGainIndex; | 2 . . . 12 | vlclbf |
| repeatCount; | 2 . . . 13 | vlclbf |
| } | | |
| while (repeatCount != kRepeatAllRemaining); | | |

For a specific implementation, Table 3 is used for the coded gain parameter $g_c$. For indices i>17, the gain parameter is $g_c(i)=-g_c(i-17)$.

TABLE 3

Example coded linear gain parameter table

| Index i | $g_c$ |
|---|---|
| 0 | 0.0 (for L/R coding) |
| 1 | 0.25118864 |
| 2 | 0.29853824 |
| 3 | 0.35481337 |
| 4 | 0.42169651 |
| 5 | 0.50118721 |
| 6 | 0.59566212 |
| 7 | 0.70794576 |
| 8 | 0.84139514 |
| 9 | 1.00000000 |
| 10 | 1.18850219 |
| 11 | 1.41253757 |
| 12 | 1.67880404 |
| 13 | 1.99526238 |
| 14 | 2.37137365 |
| 15 | 2.81838298 |
| 16 | 3.34965467 |
| 17 | 3.98107195 |

TABLE 4 cacGainIndex coding table (note that indices i in the range [18, 34] indicate negative gains, where negative gains may apply when signal A = −B, i.e., input audio channels are (180 degrees) out of phase) GainIndex, binary code of cacGainIndex 0, code 1 0
1, code 0 0 0 0 0 1 1 1
2, code 0 0 0 0 0 0 1 0 0
3, code 0 0 1 1 0 0 1 1
4, code 0 0 0 0 0 0 1 1
5, code 0 0 0 0 0 1 0
6, code 0 0 1 1 1
7, code 1 1 1 0
8, code 0 0 0 1
9, code 0 1 0
10, code 0 1 1
11, code 1 1 1 1
12, code 0 0 1 0 1 0
13, code 0 0 1 1 0 0 0
14, code 0 0 0 0 0 0 0 1
15, code 0 0 0 0 0 0 1 0 1
16, code 0 0 0 0 0 1 1 0 1
17, code 0 0 0 0 0 0 0 0 0 0
18, code 0 0 0 0 0 0 0 0 0 1 1 1 0 1
19, code 0 0 0 0 0 0 0 0 0 1 1 1 0 0
20, code 0 0 0 0 0 0 0 0 0 1 0 0 1 0
21, code 0 0 0 0 0 0 0 0 0 1 0 1
22, code 0 0 0 0 0 1 1 0 0 1
23, code 0 0 0 0 0 0 0 0 1
24, code 0 0 1 1 0 1
25, code 0 0 1 0 0
26, code 1 1 0
27, code 0 0 0 0 1
28, code 0 0 1 0 1 1
29, code 0 0 1 1 0 0 1 0
30, code 0 0 0 0 0 1 1 0 0 0
31, code 0 0 0 0 0 0 0 0 0 1 1 0
32, code 0 0 0 0 0 0 0 0 0 1 0 0 1 1
33, code 0 0 0 0 0 0 0 0 0 1 1 1 1
34, code 0 0 0 0 0 0 0 0 0 1 0 0 0

TABLE 5 coding table - Repeat Count, binary code of repeatCount 0, code 0 1
1, code 1 1
2, code 1 0 0
3, code 0 0 1 0
4, code 1 0 1 0
5, code 0 0 0 1 1
6, code 1 0 1 1 0
7, code 0 0 0 1 0 1
8, code 0 0 1 1 1 0
9, code 1 0 1 1 1 0
10, code 0 0 1 1 0 0 0
11, code 0 0 1 1 0 1 0
12, code 0 0 1 1 1 1 0
13, code 1 0 1 1 1 1 1
14, code 0 0 0 1 0 0 1 1
15, code 0 0 1 1 0 0 1 1

TABLE 5-continued

| coding table - Repeat Count, binary code of repeatCount |
|---|
| 16, code 0 0 1 1 0 1 1 1 |
| 17, code 0 0 1 1 1 1 1 1 |
| 18, code 1 0 1 1 1 1 0 1 |
| 19, code 0 0 1 1 0 0 1 0 0 |
| 20, code 0 0 1 1 0 1 1 0 0 |
| 21, code 0 0 1 1 1 1 1 0 0 |
| 22, code 1 0 1 1 1 1 0 0 1 |
| 23, code 0 0 0 1 0 0 1 0 0 0 |
| 24, code 0 0 0 1 0 0 1 0 0 1 |
| 25, code 0 0 1 1 0 1 1 0 1 0 |
| 26, code 0 0 1 1 1 1 1 0 1 0 |
| 27, code 0 0 1 1 1 1 1 0 1 1 |
| 28, code 0 0 0 1 0 0 1 0 1 0 0 |
| 29, code 0 0 0 1 0 0 1 0 1 0 1 |
| 30, code 0 0 1 1 0 0 1 0 1 0 1 |
| 31, code 0 0 1 1 0 0 1 0 1 0 0 |
| 32, code 0 0 0 1 0 0 1 0 1 1 1 |
| 33, code 0 0 1 1 0 1 1 0 1 1 0 |
| 34, code 0 0 1 1 0 1 1 0 1 1 1 |
| 35, code 1 0 1 1 1 1 0 0 0 1 |
| 36, code 0 0 1 1 0 0 1 0 1 1 |
| 37, code 0 0 0 1 0 0 1 0 1 1 0 0 |
| 38, code 0 0 0 1 0 0 1 0 1 1 0 1 |
| 39, code 1 0 1 1 1 1 0 0 0 0 0 0 |
| 40, code 1 0 1 1 1 1 0 0 0 0 0 1 |
| 41, code 1 0 1 1 1 1 0 0 0 0 1 |
| 42, code 0 0 0 1 0 0 0 |
| 43, code 0 0 0 0 |

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is to be regarded as illustrative instead of limiting.

What is claimed is:

1. A decoder-side method for outputting a plurality of audio channels of a sound program, the method comprising:

receiving an audio channel of a sound program, a residual signal, a gain parameter and a delay parameter, wherein the audio channel and the residual signal are received on a frame by frame basis, and the gain parameter is a time sequence of gain values in a sub-band domain that varies over time and on a per sub-band basis over an entire duration of the sound program, and wherein each frame of the audio channel is associated with a respective group of gain values of the gain parameter;

adjusting each frame of the audio channel in accordance with the respective group of gain values of the gain parameter and in accordance with the delay parameter, to produce an adjusted audio signal;

combining the adjusted audio signal with the residual signal to produce a combined signal; and outputting for playback i) the audio channel as a first audio channel of the sound program, and ii) the combined signal as a second audio channel of the sound program.

2. The method of claim 1 wherein the delay parameter is a time sequence of delay values in a sub-band domain that varies over time and on a per sub-band basis over the entire duration of the sound program, and wherein each frame of the audio channel is associated with a respective group of delay values of the delay parameter, and wherein adjusting each frame of the audio channel in accordance with the delay parameter comprises adjusting each frame in accordance with the respective group of delay values of the delay parameter to produce the adjusted audio signal.

3. The method of claim 1 wherein the audio channel is received as a first time sequence of channel frames, and the residual signal is received as a first time sequence of residual frames, and the gain parameter and the delay parameter are updated on a frame by frame basis for the first time sequence of channel frames, the method further comprising, after having received the first time sequence of channel frames and the first time sequence of residual frames:

receiving the audio channel as a second time sequence of channel frames, the residual signal as a second time sequence of residual frames, and the gain parameter and the delay parameter updated on a frame by frame basis for the second time sequence of channel frames;

adjusting the second time sequence of channel frames in accordance with the gain parameter and the delay parameter as updated for the second time sequence of channel frames, to produce a second time sequence of adjusted frames of the adjusted audio signal;

combining the second time sequence of adjusted frames with the second time sequence of channel frames to produce a second time sequence of combined frames; and outputting for playback i) the second time sequence of channel frames as the second audio channel of the sound program, and ii) the second time sequence of combined frames as the first audio channel of the sound program.

4. The method of claim 1 further comprising:

receiving a second residual signal, a second gain parameter and a second delay parameter;

adjusting the audio channel in accordance with the second gain parameter and the second delay parameter, to produce a second adjusted audio signal;

combining the second adjusted audio signal with the second residual signal to produce a second combined signal; and outputting for playback i) the audio channel as the first audio channel of the sound program, and ii) the combined signal as the second audio channel of the sound program, and iii) the second combined signal as a third audio channel of the sound program.

5. The method of claim 1 wherein the gain parameter and the delay parameter are quantized parameters, wherein the quantized parameters were applied by an encoder-side process to align the audio channel with another audio channel when producing the residual signal.

6. The method of claim 1 wherein the received gain and delay parameters are quantized parameters, wherein unquantized versions of the gain and delay parameters were applied by an encoder-side process to align the audio channel with another audio channel when producing the residual signal.

7. The method of claim 1 further comprising an encoder-side operation of determining the gain parameter and the delay parameter by minimizing energy of the residual signal or minimizing bit count needed to transmit the audio channel of the sound program.

8. A decoder-side method for outputting a plurality of audio channels of a sound program, the method comprising:

receiving a sum audio signal, a residual audio signal, a gain parameter, and a delay parameter;

adding the sum audio signal to the residual audio signal to produce a first combined signal;

computing a first difference between the sum audio signal and the residual audio signal, and subtracting the first combined signal from said first difference, to produce a second difference;

adjusting the first combined signal in accordance with the gain parameter and the delay parameter, to produce an adjusted audio signal, and combining the adjusted audio signal with the second difference to produce a second combined signal; and outputting for playback i) the first combined signal as a first audio channel of the sound program, and ii) the second combined signal as a second audio channel of the sound program.

9. The method of claim 8 further comprising an encoder-side process in which a quantization noise level, generated by quantization of the sum audio signal, is controlled to be higher than a noise level generated by quantization of the residual audio signal.

10. A decoder-side method for outputting a plurality of audio channels of a sound program, the method comprising:

receiving a sum audio signal, a residual audio signal, and a gain parameter;

generating an inverse mixing matrix using the gain parameter;

performing a matrix multiplication using the inverse mixing matrix and the sum audio signal and the residual audio signal to produce a first result and a second result; and outputting for playback the first result as a first audio channel of the sound program, and the second result as a second audio channel of the sound program.

11. The method of claim 10 wherein the inverse mixing matrix is a 2×2 matrix and does not include time-delay compensation.

12. The method of claim 10 wherein the inverse mixing matrix comprises $$\frac{1}{1+g^2}\begin{bmatrix} 1 & g \\ g & -1 \end{bmatrix}$$

where g is the gain parameter.

13. The method of claim 10 further comprising an encoder-side process of generating a mixing matrix based on minimizing energy of the residual audio signal to reduce transmission bit rate, and without time-delay compensation; and performing a matrix multiplication using the mixing matrix to produce the sum audio signal and the residual audio signal.

14. The method of claim 10 further comprising an encoder-side process of generating a mixing matrix based on minimizing quantization noise when the residual audio signal is quantized prior to transmission to the decoder-side, and without time-delay compensation; and performing a matrix multiplication using the mixing matrix to produce the sum and residual audio signals.

15. The method of claim 10 further comprising an encoder-side process of generating a mixing matrix without time-delay compensation; and performing a matrix multiplication using the mixing matrix to produce the sum audio signal and the residual audio signal, wherein the mixing matrix and the inverse mixing matrix are identical.

16. The method of claim 10 further comprising:

receiving from an encoder side process a bitstream that contains the sum audio signal, the residual audio signal, and an index of a quantized gain parameter; and using the index to access a table of gain parameter values and thereby obtain a gain parameter value, wherein generating the inverse mixing matrix using the gain parameter comprises using the gain parameter value obtained from the table.

17. The method of claim 16 wherein the sum audio signal, the residual audio signal, and the gain parameter are in sub-band domain, and the bitstream comprises a repeat count that indicates a number of sub-bands to which a current value of the index is to be applied by a decoder-side process.

18. The method of claim 17 wherein the bitstream further comprises an all remaining flag which is an integer larger than a total number of sub-bands that define the sub-band domain.

19. The method of claim 16 wherein the index of the quantized gain parameter in the bitstream has been variable length coded.

20. The method of claim 16 wherein the table of gain parameter values comprises Table 3.

* * * * *